United States Patent [19]

Joy, III et al.

[11] Patent Number: 5,008,090

[45] Date of Patent: Apr. 16, 1991

[54] CATALYTIC PROCESS FOR MINIMIZING THE $H_2S$ EMISSIONS FROM AUTOMOTIVE EXHAUST

[75] Inventors: George C. Joy, III, Arlington Heights; George R. Lester, Park Ridge; Richard E. Marinangeli, Arlington Heights, all of Ill.

[73] Assignee: Allied-Signal Inc., Morris Township, Morris County, N.J.

[21] Appl. No.: 197,172

[22] Filed: May 23, 1988

Related U.S. Application Data

[63] Continuation-in-part of Ser. No. 62,024, Jun. 15, 1987, Pat. No. 4,760,044.

[51] Int. Cl.$^5$ .......................... B01D 47/00; B01J 8/02
[52] U.S. Cl. .................. 423/212; 423/213.2; 423/213.5
[58] Field of Search .................. 423/212, 213.2, 213.5; 502/65, 302, 303, 304

[56] References Cited

U.S. PATENT DOCUMENTS

| | | | |
|---|---|---|---|
| 3,767,453 | 10/1973 | Hoekstra | 117/46 CA |
| 3,785,998 | 1/1974 | Hoekstra | 252/477 R |
| 3,840,471 | 10/1974 | Keith et al. | 252/432 |
| 3,903,020 | 9/1975 | Sergeys et al. | 252/455 R |
| 3,920,583 | 11/1975 | Stanley | 252/465 |
| 4,157,316 | 6/1979 | Thompson et al. | 423/213.5 |
| 4,552,733 | 11/1985 | Thompson et al. | 423/213.5 |
| 4,760,044 | 7/1988 | Joy et al. | 423/213.5 |
| 4,780,447 | 10/1988 | Kim et al. | 423/213.5 |

OTHER PUBLICATIONS

G. J. Barnes and J. C. Summers, "Hydrogen Sulfide Formation Over Automotive Oxidation Catalysts", *Soc. of Automotive Engineers*, Paper No. 750093.

*Primary Examiner*—Gary P. Straub
*Assistant Examiner*—Lori F. Cuomo
*Attorney, Agent, or Firm*—Frank S. Molinaro; Harold N. Wells; Roger H. Criss

[57] ABSTRACT

This invention relates to a catalyst comprising a mixture of a primary refractory inorganic oxide having dispersed thereon at least one first active component selected from the group consisting of rare earth oxides and a secondary support consisting of zirconia, titania or cerium oxide having dispersed thereon at least one second active component which is a metal oxide, the metal selected from the group consisting of metals which form a stable sulfide said mixture having at least one main catalytic metal selected from the group consisting of platinum, palladium, rhodium, ruthenium and iridium deposited thereon. This invention also relates to a method of manufacturing said catalyst. Finally a method to minimize the formation of $H_2S$ when automotive exhaust is contacted with a method is also claimed.

18 Claims, No Drawings

CATALYTIC PROCESS FOR MINIMIZING THE H₂S EMISSIONS FROM AUTOMOTIVE EXHAUST

CROSS-REFERENCE TO RELATED APPLICATIONS

This application is a Continuation-in-part of prior copending application, Ser. No. 062,024, filed June 15, 1987, Now U.S. Pat. No. 4,760,044.

BACKGROUND OF THE INVENTION

Gaseous waste products resulting from the combustion of hydrocarbonaceous fuels, such as gasoline and fuel oils, comprise carbon monoxide, hydrocarbons and nitrogen oxides as products of combustion or incomplete combustion, and pose a serious health problem with respect to pollution of the atmosphere. While exhaust gases from other carbonaceous fuel-burning sources, such as stationary engines, industrial furnaces, etc., contribute substantially to air pollution, the exhaust gases from automotive engines are a principal source of pollution. Because of these health problem concerns, the Environmental Protection Agency (EPA) has promulgated strict controls on the amounts of carbon monoxide, hydrocarbons and nitrogen oxides which automobiles can emit. The implementation of these controls has resulted in the use of catalytic converters to reduce the amount of pollutants emitted from automobiles.

In order to achieve the simultaneous conversion of carbon monoxide, hydrocarbon and nitrogen oxide pollutants to innocuous gases, it has become the practice to employ exhaust gas catalysts in conjunction with air-to-fuel ratio control means which functions in response to a feedback signal from an oxygen sensor in the engine exhaust system. This type of catalyst is commonly called a three component control catalyst. The air-to-fuel ratio control means is typically programmed to provide fuel and air to the engine at a ratio at or near the stoichiometric balance of oxidants and reductants in the hot exhaust gases at engine cruising conditions, and to a stoichiometric excess of reductants during engine startup and at engine acceleration conditions. The result is that the composition of the exhaust gases with which the catalyst is contacted fluctuates almost constantly, such that conditions to which the catalyst is exposed are alternatively net-reducing (fuel rich) and net-oxidizing (fuel lean). A catalyst for the oxidation of carbon monoxide and hydrocarbons and the reduction of nitric oxide must be capable of operating in such a dynamic environment.

The exhaust gas also contains other components such as sulfur oxides, phosphorus and zinc compounds which are known catalyst poisons. The sulfur oxides present in the exhaust stream can react with the catalyst to form other products. For example under fuel lean (net-oxidizing) conditions, sulfur dioxide ($SO_2$) reacts with oxygen ($O_2$) over the catalyst to form sulfur trioxide ($SO_3$) which is then converted to sulfates ($SO_4^=$) by reaction with water. Under fuel rich (net-reducing) conditions the $SO_2$ reacts with hydrogen ($H_2$) to form hydrogen sulfide ($H_2S$). The formation of $H_2S$ is particularly objectionable because of its strong odor.

In addition to the formation of $H_2S$ over noble metal catalyst, a storage phenomenon has also been observed. This storage phenomenon has been documented in the literature, G. J. Barnes and J. C. Summers, "Hydrogen Sulfide Formation Over Automotive Oxidation Catalysts," Society of Automotive Engineers, Paper No. 750093. The experimenters showed that sulfur accumulated on noble metal catalysts under both oxidizing and reducing atmospheres. For example, under oxidizing conditions the sulfur is typically stored as sulfates ($SO_4^=$) which is converted to $H_2S$ under reducing conditions.

Although this phenomenon has been recognized for many years, the problem which it generates, i.e. unpleasant odor, was relatively minor and was not of much concern until recently. In the past few years automotive catalyst technology has improved so that the catalyst are much more active than previous catalysts. Part of this improvement has been achieved by increasing the content of the rare earths (hereinafter referred to as a first active component) present in the catalytic composite. Unfortunately, the rare earths appear to increase the storage of sulfur during fuel lean operation, and when release occurs the concentration of hydrogen sulfide is much larger than would have been anticipated, based on the sulfur content of the fuel. Consequently, the resultant odor is quite noticeable and many more drivers are offended by the increased hydrogen sulfide odors.

Since the odor has become more noticeable and objectionable, a need exists to minimize the hydrogen sulfide emissions from catalyst equipped automobiles. The instant invention cures this problem by providing a catalytic composite which contains a metal that forms stable metal sulfides (hereinafter referred to as a second active component) under rich conditions and therefore minimizes the release of hydrogen sulfide under rich conditions. Some of the metals which are very effective in this regard are lead, zinc, copper, nickel, and cobalt.

Catalysts which contain second active components such as nickel are well known in the art. For example, U.S. Pat. Nos. 3,840,471 and 3,903,020 teach the use of precious metals in combination with rare earth stabilizers and promoters such as nickel and iron. Thus, the prior art discloses that these second active components are used as promoters. That is, these metals are capable of promoting reactions such as the water gas shift and steam reforming reactions. No mention has been made in the art about using such second active components to minimize the amount of hydrogen sulfide which is formed over conventional automotive catalysts. Therefore, the present invention presents a new use of these second active components and fills a need in the field of automotive catalysts.

Additionally, the usual manner of depositing said second active components is to uniformly distribute these components on a high surface area refractory inorganic oxide support which is usually alumina and which also has noble metals deposited thereon. However, when these catalysts are exposed to high temperatures (>750° C.), the second active components can interact with the alumina support to form metal aluminates. These aluminates are very stable but are not active for the desired reactions. This means that the catalytic composite will lose activity upon exposure to such high temperatures, due to changes in the second active components. Another factor is that while components such as nickel, cobalt, etc. promote some reactions in conjunction with the noble metal species, they also act as a poison to the noble metal components for other reactions. Both of these phenomena are well known in the art.

The instant invention also cures this problem by depositing the second active component on a secondary refractory inorganic oxide such as zirconia, ceria, titania, etc. Since the second active components are metals, this means that metal aluminates are not formed at high temperatures because the metals do not interact with either zirconia, ceria or titania, and are not in direct contact with the alumina support. Secondly, because the second active components are not in intimate contact with a majority of the noble metal components, there is less detrimental interaction between the second active component and the noble metal species. An improved catalytic composite is thereby produced by the instant invention.

In certain applications nitric oxides are not a problem and therefore a catalyst need only oxidize the hydrocarbons and carbon monoxide to carbon dioxide and water. This type of catalyst is commonly called an oxidation catalyst. Additionally, some applications may require both a three component control catalyst and an oxidation catalyst. In both of these possible applications, the exhaust gas may become fuel-rich and thus present the same problem as for a three component control catalyst. The instant invention also cures the $H_2S$ problem associated with an oxidation catalyst.

SUMMARY OF THE INVENTION

This invention relates to a catalytic composite and a method of manufacturing said composite for the treatment of an exhaust gas from an internal combustion engine. The catalytic composite comprises a mixture of a primary refractory inorganic oxide having dispersed thereon at least one of a first active component selected from the group consisting of rare earth oxides and a secondary refractory inorganic oxide support selected from the group consisting of zirconia, titania, ceria, silica, magnesia, natural and synthetic zeolites having dispersed thereon at least one of a second active component which is an oxide of a metal, the metal selected from the group consisting of metals which form stable metal sulfides under fuel rich conditions, said mixture having at least one main catalytic metal selected from the group consisting of platinum, palladium, rhodium, ruthenium and iridium deposited thereon.

Accordingly, one specific embodiment of the invention comprises a catalytic composite for treatment of an exhaust gas from an internal combustion engine, said exhaust gas comprising carbon monoxide, hydrocarbons, nitrogen oxides and sulfur oxides. The catalytic composite comprises a mixture of an alumina support having dispersed thereon a cerium oxide and a ceria support having dispersed thereon nickel oxide and dispersing on said mixture platinum and rhodium.

A further embodiment of the invention comprises a method of manufacturing said composite comprising the steps of:

(a) dispersing at least one first active component selected from the group consisting of the rare-earth oxides onto a primary refractory inorganic oxide;

(b) dispersing at least one second active component selected from the group consisting of metals which form a stable sulfide under fuel rich conditions onto a secondary refractory inorganic oxide support selected from the group consisting of zirconia, titania, ceria, silica, magnesia, natural and synthetic zeolites;

(c) preparing a slurry with the mixture of said supports formed in steps (a) and (b);

(d) coating a metallic or ceramic solid honeycomb support with the slurry of step (c) and calcining said coated support;

(e) dispersing at least one main catalytic metal selected from the group consisting of platinum, palladium, rhodium, ruthenium and iridium onto said coated support, calcining and recovering the resultant catalytic composite.

It is also another embodiment of the invention to provide a method of manufacturing a catalytic composite which comprises the steps of:

(a) dispersing at least one first active component selected from the group consisting of the rare-earth oxides and at least one main catalytic metal selected from the group consisting of platinum, palladium, rhodium, ruthenium and iridium onto a primary refractory inorganic oxide;

(b) dispersing at least one second active component which forms a stable sulfide under fuel rich conditions onto a secondary support selected from the group consisting of zirconia, titania, ceria, silica, magnesia, natural and synthetic zeolites;

(c) preparing a slurry with the mixture of said supports formed from steps (a) and (b);

(d) coating a metallic or ceramic solid honeycomb support with the slurry of step (c), calcining said coated support, and recovering the resultant catalytic composite.

It is also an embodiment of the invention to provide a method of minimizing the formation of hydrogen sulfide when automotive exhaust is contacted with a catalytic composite comprising contacting said exhaust with a catalytic composite comprising a mixture of a primary refractory inorganic oxide having dispersed thereon at least one of a first active component selected from the group consisting of rare-earth oxides and a secondary refratory inorganic oxide support selected from the group consisting of zirconia, titania, ceria, silica, magnesia, natural and synthetic zeolites having dispersed thereon at least one of a second active component which is an oxide of a metal, the metal selected from the group of metals which form a stable sulfide under fuel rich conditions, said mixture having at least one noble metal selected from the group consisting of platinum, palladium, rhodium, ruthenium and iridium deposited thereon.

Other objects and embodiments will become more apparent after a more detailed description of the invention.

DETAILED DESCRIPTION OF THE INVENTION

As heretofore indicated, the present invention relates to a catalytic composite and a method of manufacturing said composite comprising a mixture of a primary refractory inorganic oxide having dispersed thereon at least one of a first active component selected from the group consisting of the rare earth oxides and a secondary refractory inorganic oxide support selected from the group consisting of zirconia, titania, ceria, silica, magnesia, natural and synthetic zeolites having dispersed thereon at least one of a second active component which is an oxide of a metal, the metal selected from the group of metals which form a stable sulfide under fuel rich conditions, said mixture having at least one main catalytic element selected from the group consisting of platinum, palladium, rhodium, ruthenium and iridium. The primary refractory inorganic oxide may be selected from the group consisting of alumina, silica, aluminosilicates, zirconia, titania or mixtures thereof with alumina being preferred. Generally, the oxide support can be conveniently employed in particulate form as pills, pellets, granules, rings, spheres, etc. Alternatively, a monolithic structure may be employed. The secondary refractory inorganic oxide support may be zirconia, titania, ceria, silica, magnesia, natural and synthetic zeolites with ceria being preferred.

The particulate form of the catalyst is especially desirable where large volumes of catalytic composites are needed, and for use in circumstances in which periodic replacement of the catalytic composite may be desired. In circumstances in which less mass is desirable or in which movement or agitation of particles of refractory inorganic oxide may result in attrition, dusting and resulting loss of disposed metals or undue increase in pressure drop across the particles, a monolithic structure is preferred.

In the employment of a monolithic structure, it is usually most convenient to employ the refractory inorganic oxide as a thin film or washcoat deposited on an inert carrier material which provides the structural support for said refractory oxide washcoat. The inert carrier material can be any refractory material. It is desirable that the carrier material be unreactive with the refractory oxide washcoat and not degraded by the gas to which it is exposed. Ceramic and metallic materials are preferred classes of carrier material. Examples of suitable ceramic materials include sillimanite, petalite, cordierite, mullite, zircon, zircon mullite, spodumene, alumina-titanate, etc. Additionally, metallic materials which are within the scope of this invention include metals and alloys as disclosed in U.S. Pat. No. 3,920,583 which can be fabricated into the desired form, are oxidation resistant, and are otherwise capable of withstanding high temperatures.

The carrier material can best be utilized in any rigid unitary configuration which provides a plurality of pores or channels therethrough extending in the direction of gas flow. It is preferred that the configuration be a honeycomb configuration. The honeycomb structure can be used advantageously in either unitary form, or as an arrangement of multiple modules. The honeycomb structure is usually oriented such that gas flow is generally in the same direction as the cells or channels of the honeycomb structure. For a more detailed discussion of monolithic structures, refer to U.S. Pat. No. 3,785,998 and U.S. Pat. No. 3,767,453.

In one example of the invention a high surface area alumina is used as the primary inorganic oxide support. The alumina support preferably has a specific surface area ranging from 25 to 300 m$^2$/g and more preferably ranges from about 100 to about 240 m$^2$/g. The alumina also preferably has a total pore volume ranging from 0.5 to 2 cm$^3$/g and more preferably from 0.8 to 1.7 cm$^3$/g. Finally, the alumina preferably possesses a macroporosity such that the pore volume of the pores having a diameter of greater than 1,000 Angstroms ranges from about 0.05 to about 0.6 cm$^3$/g and more preferably ranges from 0.2 to 0.5 cm$^3$/g.

One example of the method of preparation comprises first impregnating a high surface area alumina with a water soluble decomposable compound of the particular first active component selected from the group consisting of the rare earths. By decomposable compound is meant a compound which decomposes to the rare earth oxide upon heating in air. Examples of water soluble decomposable rare earth compounds include cerium acetate, lanthanum acetate, neodymium acetate, europium acetate, holmium acetate, yttrium acetate, praesodymium acetate, dysprosium acetate, cerium nitrate, lanthanum nitrate, neodymium nitrate, europium nitrate, holmium nitrate, yttrium nitrate, praesodymium nitrate, dysprosium nitrate, cerium chloride, lanthanum chloride, neodymium chloride, europium chloride, holmium chloride, yttrium chloride, praesodymium chloride, dysprosium chloride. Thus when cerium is the desired first active component, cerium acetate can be dissolved in water and a high surface area alumina can be added to the solution. This mixture can then be dried and calcined in air at a temperature of about 400° to about 700° C. for a time of about one to three hours. This results in the formation of cerium oxide which is uniformly distributed throughout the alumina.

It is also contemplated as another embodiment of this invention to add the first active component to the primary refractory inorganic oxide support as a solid. Thus, after mixing, a homogeneous mixture of the two solids is obtained. The only criterion required of these solids is that they be insoluble in water and in the acid/water solution used to prepare the slurries of the supports as described hereinafter. Examples of these insoluble solids include cerium sulfate, lanthanum sulfate, neodymium sulfate, europium sulfate, holmium sulfate, yttrium sulfate, cerium oxalate, lanthanum oxalate, neodymium oxalate, europium oxalate, holmium oxalate, yttrium oxalate, cerium oxide, lanthanum oxide, neodymium oxide, europium oxide, holmium oxide, yttrium oxide, with the oxides being preferred. Thus a specific example consists of adding cerium oxide to an alumina powder.

A second step in this example of the method of preparation comprises impregnating a secondary inorganic oxide support with a water soluble decomposable compound of the second active component. Examples of secondary inorganic oxide supports include zirconia, ceria, titania, silica, magnesia, natural and synthetic zeolites. Illustrative examples of the second active component which may be used in this invention are nickel oxide, lead oxide, zinc oxide, cobalt oxide, copper oxide, etc. Additionally, examples of compounds of second active components which can be used to deposit said second active component onto the secondary inorganic oxide support include nickel nitrate, zinc nitrate, cobalt nitrate, copper nitrate, lead nitrate, nickel chloride, zinc chloride, cobalt chloride, copper chloride, lead chloride, nickel acetate, zinc acetate, cobalt acetate, copper acetate, lead acetate. Thus, if ceria is the desired secondary refractory oxide support and nickel is the desired second active component then the ceria may be impregnated with an aqueous solution of nickel nitrate. After the ceria is impregnated with the nickel salt, the mixture is dried, and then calcined in air at a temperature of about 400° to about 700° C. for about one to about 3 hours. This results in a uniform distribution of nickel oxide on the cerium oxide.

In the next step of this example of the method of preparation, the appropriate amounts of the primary refractory inorganic oxide support containing a first active component is mixed with the secondary refractory oxide support containing a second active component and a slurry is prepared using the combined powders. The slurry can be prepared by means known in the art such as combining the appropriate amounts of oxide powders with water and an acid such as nitric acid, hydrochloric acid, sulfuric acid, etc. The resultant slurry is milled for about 2 to 6 hours to form a usable slurry. This slurry can now be used to deposit a thin film or washcoat onto the monolithic carrier. It is preferred that the primary refractory oxide, such as alumina, be present on the monolithic support in amounts in the range from about 28 g per liter of carrier volume to about 355 g per liter of carrier volume, where the volume is measured by the exterior dimensions of the monolithic carrier structure.

Similarly, the concentration of the first active component, such as cerium or lanthanum, is preferred to be from about 3.5 g per liter to about 55 g per liter of monolithic carrier volume. The secondary support, such as ceria or zirconia, concentration is preferred to be from about 0.7 to about 35 g per liter of monolithic carrier volume. Finally, the second active component, such as nickel or cobalt, is preferred to be present in an amount in the range of about 0.7 to about 15 g per liter of monolithic carrier volume.

The final step in this example of the method of preparation comprises depositing at least one main catalytic element onto the mixed inorganic oxide support. The main catalytic metal may be chosen from the group consisting of platinum, iridium, rhodium, palladium, ruthenium and mixtures thereof. The main catalytic metal may be incorporated into the mixed inorganic oxide support material in any suitable manner. The preferred method of dispersing the main catalytic metal onto the mixed inorganic oxide support containing a first and second active component involves the utilization of a water soluble decomposable compound of the particular main catalytic metal for impregnation of the monolithic carrier which has been coated with, for example, the cerium oxide/alumina plus nickel/ceria supports.

It is also contemplated as within the scope of this invention that the main catalytic metal be dispersed solely on the primary refractory inorganic oxide support which contains a first active component. This can be accomplished by impregnating a primary refractory oxide support having dispersed thereon a first active component with an aqueous solution of the main catalytic metal, drying and calcining in air. This primary refractory inorganic oxide support which has dispered thereon at least one first active component and at least one main catalytic metal is now mixed with a second refractory inorganic oxide containing a second active component and then processed as described herein to form a slurry. Finally, this slurry is applied to a ceramic or metallic monolithic carrier, dried and calcined to give a catalytic composite. It should be pointed out that the method of preparation just described may yield a catalytic composite that does not have equivalent properties to a catalytic composite prepared by the method described above in this application.

When platinum and rhodium are the desired main catalytic metals, chloroplatinic acid and rhodium chloride are examples of soluble compounds which can be used for impregnating the support. The chloroplatinic acid and rhodium trichloride can be in a common aqueous solution or in seprate aqueous solutions. Where both a platinum and a rhodium component are desired and separate aqueous solutions are used, the impregnation of the primary inorganic oxide support or the primary inorganic oxide plus secondary inorganic oxide support with the solutions can be performed sequentially in any order. Other water soluble compounds or complexes may be employed to prepare the impregnation solutions. These include ammonium chloroplatinate, hydroxy disulfite platinum (II) acid, bromoplatinic acid, platinum trichloride, platinum tetrachloride hydrate, platinum dichlorocarbonyl dichloride, dinitrodiamino platinum, sodium tetranitroplatinate, hexamminerhodium chloride, rhodium carbonylchloride, rhodium trichloride hydrate, rhodium nitrate, sodium hexachlororhodate, and sodium hexanitrorhodate.

Utilization of a platinum or rhodium chloride compound such as chloroplatinic acid or rhodium trichloride is ordinarily preferred. Hydrogen chloride, nitric acid or other suitable materials may be added to the solution in order to further facilitate the uniform distribution of the noble metal components throughout the alumina support material.

If it is desired to disperse palladium onto an inorganic oxide support, the palladium may be added to the inorganic oxide support by commingling the latter with an aqueous solution of chloropalladic acid, dying and calcining in air. Other water soluble compounds or complexes of palladium may be employed such as palladium chloride, palladium nitrate, diamminepalladium hydroxide, and tetramminepalladium chloride.

Further, when an iridium component is incorporated into the catalyst, the iridium component may be added to the inorganic oxide support by commingling the latter with an aqueous or anhydrous alcoholic solution of iridium salts. Examples of such salts are hexachloroiridate (IV) acid, hexachloroiridate (III) acid, dichlorodihydrooxoiridate (III) acid, ammonium hexachloroiridate (III), ammonium aquohexachloroiridate (IV), tetraamminedichloroiridate (III) chloride, and aquotetraammineiridate (III) chloride.

When the catalytic composite is deposited on a monolithic structure as heretofore described, the main catalytic metal content is such that it ranges from about 0.03 g to about 8.8 g per liter of monolithic carrier volume. In particular, when the main catalytic metal is platinum, the platinum content ranges from 0.15 g per liter to about 8.8 g per liter of monolithic carrier volume. Additionally, when the main catalytic metal is palladium, the content ranges from 0.15 to 8.8 g per liter of monolithic carrier volume. Finally, when the main catalytic element is rhodium, the rhodium content ranges from 0.03 to 2.5 g per liter of monolithic carrier volume. If both platinum and rhodium are present, the ratio of the platinum content to rhodium content is from about 2:1 to about 20:1 platinum:rhodium. When the main catalytic metals are supported in another manner, such as upon pellets comprising an inorganic oxide, the metals are present in amounts ranging from about 0.01 to about 4 weight percent based on the weight of the pellets. Specifically, in the case of platinum the range is 0.1 to 4 weight percent, in the case of palladium the range is 0.1 to 4 weight percent, and in the case of rhodium the range is 0.01 to 2 weight percent. If both platinum and rhodium are present, the ratio of the platinum to rhodium content is from about 2:1 to about 20:12 platinum:rhodium.

A further essential feature of the present invention is the presence of a second active component which can act as a promoter or can form a stable sulfide under fuel rich conditions. This component should be selected from the group consisting of metals which form a sulfide such that the equilibrium constant, $K_p$, for the following reaction $$MS + H_2 \rightarrow H_2S + M_r \quad (1)$$

is less than $2 \times 10^{-3}$ at temperatures as high as 700° C., where MS represents a metal sulfiede and $M_r$ represents a reduction product of the metal sulfide and Kp is defined as $$Kp = \frac{P_{H2S}}{P_{H2}} \quad (2)$$

where $P_{H2S}$ is the partial pressure of hydrogen sulfide and $P_{H2}$ is the partial pressure of hydrogen in the exhaust gas for the above equilibrium. Specifically, this group of metals includes but is not limited to nickel, copper, cobalt, lead and zinc. A mechanism of how this group of metals minimizes the hydrogen sulfide production over automotive catalysts follows. It is to be understood that this mechanism is presented by way of illustration and is not intended to limit the broad scope of the invention.

Gasoline fuel typically contains about 0.005 to about 0.7 weight percent sulfur, usually as organic sulfur compounds. During the combustion process these sulfur compounds are converted to gaseous sulfur compounds such as $SO_2$ and $SO_3$. In order to completely combust the gasoline fuel, at least a stoichiometric weight amount of air is required. For example if the gasoline is indolene, the stoichiometric weight ratio is 14.56:1. of air:fuel. Using this ratio, therefore, one obtains that the gaseous sulfur compound concentration in the exhaust gas may range from about 3 to about 480 ppm.

During the time that the exhaust gas is stoichiometric or net oxidizing, certain components of the catalyst are capable of reacting with the gaseous sulfur compounds in the exhaust gas ($SO_2$ and $SO_3$) and with $O_2$ in the exhaust gas to form stable sulfates. For example, alumina would be expected to form sulfates of aluminum such as $Al_2(SO_4)_3$ at temperatures below about 400° C. and at a gaseous sulfur oxides ($SO_x$) concentration of 20 ppm; cerium oxide will similarly form sulfates of cerium such as $Ce_2(SO_4)_3$ at the same gaseous $SO_x$ level at temperatures below about 500° C., while lanthanum oxide will form sulfates of lanthanum at the same $SO_x$ level but at temperatures below about 700° C.

The resultant sulfates formed on the catalytic composite at the conditions described above are unstable under fuel rich conditions. Therefore, when the air/fuel ratio becomes fuel rich, the solid sulfates will begin to decompose with the subsequent formation of hydrogen sulfide ($H_2S$), which will be emitted from the exhaust at concentrations that may be noxious. The reason that the concentrations of $H_2S$ may be excessively high is that large amounts of sulfates can be stored on the catalytic composite under periods of stoichiometric or fuel lean operations and then released during periods of fuel rich operation.

More specifically, under fuel rich conditions the following general equilibria occur.

$$MSO_4 + H_2 \rightleftharpoons H_2S + H_2O + M \quad (3)$$

$$M_r + H_2S \rightleftharpoons MS + H_2 \quad (4)$$

where M represents a metal, $MSO_4$ represents the metal sulfate, MS represents a metal sulfide and $M_r$ represents a reduction product of the metal sulfide, i.e. either the reduced metal or a lower oxidation state metal sulfide. Examples of metals which form sulfates by the equilibrium of equation (3) include aluminum, cerium, lanthanum, etc. Examples of metals which form stable sulfides by the equilibrium of equation (4) include nickel, cobalt, zinc, lead, etc.

The instantaneous concentration of gaseous sulfur compounds in the exhaust gas from the engine is typically low, such as about 20 ppm. If all of these gaseous sulfur compounds, i.e. $SO_2$ and $SO_3$ are converted to $H_2S$ during fuel rich operation then only 20 ppm of hydrogen sulfide would be present in the exhaust exiting the tailpipe. However, much larger amounts of $H_2S$ can be formed during fuel rich operation from the release of sulfur stored on the catalyst. It is possible to calculate whether a catalytic composite will release $H_2S$ or not by calculating the equilibrium $H_2S$ and $H_2$ concentrations for a given operating condition. The calculation involves minimizing the free energy of the total gaseous and solid catalyst component system at the operating condition. Some catalytic composites will react with high levels of $H_2S$ under fuel rich operation to reestablish equilibrium at much lower concentration of $H_2S$ exiting the catalyst such that the equilibrium concentration of $H_2S$ and $H_2$ have a Kp (equation 2) of less than $2.0 \times 10^{-3}$. The second active components of the instant invention meet this criteria. During rich operation the second active component will react with all the $H_2S$ in the exhaust as it passes through the catalyst until a 20 ppm $H_2S$ concentration is reached, even if additional $H_2S$ is formed from the decomposition of stored sulfur species on the catalyst, in addition to the typical 20 ppm exhaust concentration of sulfur entering the catalyst from the engine.

Calculations of equilibrium constant have shown that metals, i.e. second-active components, which are within this group include but are not limited to nickel, cobalt, zinc, copper, lead, etc. Because these metals have such a low equilibrium constant for reaction (2), the metal sulfide is favored. This means that not only will metal sulfate which was formed under fuel lean conditions from the second active component not decompose to release hydrogen sulfide, but these metals will scavenge any hydrogen sulfide that is released by the decomposition of sulfates of the primary support or first active component or other sources of $H_2S$. Therefore, release of hydrogen sulfide is minimized.

It is also an embodiment of this invention to provide a method of minimizing the formation of hydrogen sulfide when automotive exhaust is contacted with a catalytic composite. This method comprises contacting the exhaust with a catalytic composite comprising a mixture of a primary refractory inorganic oxide having dispersed thereon at least one of a first active component selected from the group consisting of rare-earth oxides and a secondary refractory inorganic oxide support selected from the group consisting of zirconia, titania, ceria, silica, magnesium, natural and synthetic zeolites having dispersed thereon at least one of a second active component which is an oxide of a metal, the selected from the group of metals which form a stable sulfide under fuel rich conditions, said mixture having at least one noble metal selected from the group consisting of platinum, palladium, rhodium, ruthenium and iridium deposited thereon.

This process is usually accomplished by placing the catalytic composite in a container, known in the art as a converter, which is then placed in the exhaust system of the automobile. As part of this process the catalytic composite can oxidize hydrocarbons and carbon monoxide present in the exhaust to carbon dioxide and water. The catalytic composite can also reduce nitric oxide to nitrogen. The oxidation and reduction reactions can proceed simultaneously if the composition of the exhaust gas is maintained at or near the stoichiometric air-to-fuel (A:F) ratio. However, even if the A:F ratio of the exhaust gas is maintained at stoichiometry, there will be times when the A:F ratio will be fuel rich. As stated hereinbefore, it is during these fuel rich excursions that hydrogen sulfide is formed and released. The use of the instant catalyst in such a process will minimize the formation and release of hydrogen sulfide (see the examples which follow).

In addition to minimizing the concentration of hydrogen sulfide, another embodiment of the present invention is to provide a catalytic composite which is more effective at treating an exhaust gas after exposure to high temperatures. As hereinbefore explained this advantage is obtained because the secondary active component is separated from the main catalytic metal such as platinum and from the primary support such as alumina. As a result, solid state reactions between the second active component and alumina or the main catalytic metal do not occur. These reactions are well known to be detrimental to catalyst activity. Thus, after the catalytic composite of the present invention is exposed to an exhaust gas having a temperature of 850° C., the catalytic composite of the present invention is more effective at treating an exhaust stream than a catalytic composite of the prior art. Since combustion of hydrocarbons and carbon monoxide takes place over the catalytic composite, the instantaneous catalyst temperature is expected to be much higher than 850° C., under certain operating conditions.

For certain applications, it may not be necessary or desirable to deposit a first active component on the primary refractory inorganic oxide support. One of these types of applications is where only the hydrocarbon and carbon monoxide in an exhaust gas are to be treated. Usually the catalytic composite which is used in this type of application is not exposed to high temperatures and therefore stabilizers are not necessary. Additionally, the first active component may have detrimental effects on the ability of the catalytic composite to effectively treat hydrocarbon and carbon monoxide components in an exhaust stream.

Therefore, another embodiment of the present invention comprises a method of preparing a catalytic composite for treating an exhaust gas comprising the steps of:

(a) preparing a slurry of a primary refractory inorganic oxide support and a secondary refractory inorganic oxide support selected from the group consisting of ceria, zirconia, titania, silica, magnesia, natural and synthetic zeolites, having dispersed thereon at least one component selected from the group consisting of metals which form a stable sulfide under fuel rich conditions.

(b) coating a metallic or ceramic solid honeycomb support with the slurry of step (a);

(c) calcining said coated support in air; and (d) dispersing at least one main catalytic metal selected from the group consisting of platinum, palladium, rhodium, ruthenium and iridium onto said coated support, calcining and recovering the resultant catalytic composite.

Additionally, another embodiment of this invention comprises a catalytic composite for treating the hydrocarbon and carbon monoxide components in an exhaust stream from an internal combustion engine which comprises a mixture of (1) a primary refractory inorganic oxide support and (2) a secondary refractory inorganic oxide support selected from the group consisting of zirconia, titania, ceria, silica, magnesia, and natural and synthetic zeolites having dispersed thereon at least one component selected from the group consisting of metals which form a stable sulfide under fuel rich conditions, said mixture having at least one main catalytic metal selected from the group consisting of platinum, palladium, rhodium, ruthenium and iridium deposited thereon.

In order to more fully illustrate the advantages to be derived from the instant invention, the following examples are set forth. It is to be understood that the examples are only by way of illustration and are not intended as an undue limitation on the broad scope of the invention as set forth in the appended claims.

EXAMPLE I

This example describes a test developed to measure hydrogen sulfide emissions. The test consisted of two parts: storage of sulfur compounds and hydrogen sulfide release. The conditions for these two parts of the test are presented in Table 1 below.

TABLE 1

| Test Condition | Storage | Release |
| --- | --- | --- |
| Inlet Temperature (°C.) | 515 | 492 |
| Air/Fuel Ratio (Stoichiometry = 14.56) | 14.80 | 13.10 |
| GHSV($hr^{-1}$) | 63,000 | 63,000 |
| Duration (min) | 60 | 15 |
| Fuel Sulfur Level (ppm) | 120 | 120 |

The catalytic composite was first exposed to the storage condition to store sulfate. Then the air/fuel ratio was changed to the release condition. Exhaust samples were collected in scrubbers and analyzed for $H_2S$ using a colorimetric method established by the Environmental Protection Agency (EPA). Details on the $H_2S$ analysis method are available in EPA interim report EPA-600/2-80-068 which is available from the EPA. Samples were taken during the following time intervals: 0–1, 1–2, 2–3, 3–4, 9–10, and 14–15 minutes after switching to the release condition.

EXAMPLE II

The conventional catalytic composite was prepared by the following method. In a beaker, 5,000 grams of pseudo-boehmite alumina and 13,562 grams of a solution of cerium acetate were mixed, which solution contained 7 weight percent cerium. The resultant mixture was stirred for 30 minutes, transferred to a shallow tray, dried for 4 hours at 150° C. and finally calcined at 600° C. for 1 hour. The calcined alumina/cerium oxide powder was next stirred into a container which contained 5.33 liters of water and 48 mL of concentrated nitric acid ($HNO_3$). This mixture was ball milled for 4 hours.

An oval shaped cordierite monolith with a minor axis of 3.2 inches (8.1 cm), a major axis of 5.7 inches (14.5 cm), a length of 6.0 inches (15.2 cm) and having 400 square channels per square inch of facial area was dipped into the above described slurry. After dipping, the excess slurry was blown out with an air gun. The slurry coated monolith was calcined for about 1 hour at 540° C. The above described dipping, blow-out and calcining steps were repeated until the monolith contained 120 g of coating per liter of monolith volume.

Next the platinum and rhodium metals were impregnated onto the above-described washcoated monolith. The above-described monolith was dipped into an aqueous solution containing 10.2 mg of chloroplatinic acid (29.5 weight % Pt) per gram of solution and 5.1 mg of rhodium chloride (9.8 weight % rhodium) per gram of solution. After dipping, the excess solution was blown out with an air gun and calcined for about one hour at 540° C. This catalytic composite was designated Catalyst A. The calculated composition of catalyst A in units of g/liter was: Pt=1.56; Rh=0.11; Ce=23.3

EXAMPLE III

A first experimental catalytic composite was prepared by the following method. In a beaker, 5,000 grams of pseudo-boehmite alumina and 13,562 grams of a solution of cerium acetate were mixed, which solution contained 7 weight percent cerium. The resultant mixture was stirred for 30 minutes, transferred to a shallow tray, dried for 4 hours at 150° C. and finally calcined at 600° C. for 1 hour. The calcined alumina/cerium oxide powder was next stirred into a container which contained 5.33 liters of water and 48 mL of concentrated nitric acid ($HNO_3$).

In a beaker, 196 g of zirconia ($ZrO_2$) were added to 1,250 g of an aqueous solution of cobalt acetate (11.6 weight percent cobalt). The resultant mixture was stirred for 30 minutes, dried at 200° C. and then calcined at 540° C. for one hour. The calcined powder was added to the alumina/cerium oxide slurry and the mixture ball milled for an additional 4 hours.

An oval shaped cordierite monolith with a minor axis of 3.2 inches (8.1 cm), a major axis of 5.7 inches (14.5 cm), a length of 6.0 inches (15.2 cm) and having 400 square channels per square inch of facial area was dipped into the above described slurry. After dipping, the excess slurry was blown out with an air gun. The slurry coated monolith was calcined for about 2 hours at 540° C. The above described dipping, blow-out and calcining steps were repeated until the monolith contained 128 g of coating per liter of monolith volume.

Next the platinum and rhodium metals were impregnated onto the above-described washcoated monolith. The above-described monolith was dipped into an aqueous solution containing 10.2 mg of chloroplatinic acid (29.5 weight % Pt) per gram of solution and 5.1 mg of rhodium chloride (9.8 weight percent rhodium) per gram of solution. After dipping, the excess solution was blown out with an air gun and calcined for about one hour at 540° C. This catalytic composite was designated Catalyst B. The calculated composition of catalyst B in units of g/liter was: Pt=1.56; Rh=0.11; Ce=23.3; Co=3.53; Zr=3.53

EXAMPLE IV

A second experimental catalytic composite was prepared by the following method. In a beaker, 13,562 grams of a solution of cerium acetate, which solution contained 7 weight percent cerium, were added to 5,000 grams of pseudo-boehmite alumina. The resultant mixture was stirred for 30 minutes, transferred to a shallow tray, dried for 3 hours and 40 mins at 150° C. and finally calcined at 600° C. for 1 hour. The calcined alumina/cerium oxide powder was next stirred into a container which contained 5.33 liters of water and 48 mL of concentrated nitric acid ($HNO_3$).

In a beaker, 1,250 g of a solution of cobalt acetate (11.6 weight percent cobalt) and 188.4 g of cerium oxide ($CeO_2$) were mixed. The resultant mixture was stirred for 30 minutes, dried at 200° C. and then calcined at 540° C. for one hour. The calcined powder was added to the alumina/cerium oxide slurry and the mixture ball milled for 4 hours.

An oval shaped cordierite monolith with a minor axis of 3.2 inches (8.1 cm), a major axis of 5.7 inches (14.5 cm), a length of 6.0 inches (15.2 cm) and having 400 square channels per square inch of facial area was dipped into the above described slurry. After dipping, the excess slurry was blown out with an air gun. The slurry coated monolith was calcined for about 2 hours at 540° C. The above described dipping, blow-out and calcining steps were repeated until the monolith contained 128 g of coating per liter of monolith volume.

Next the platinum and rhodium metals were impregnated onto the above-described washcoated monolith. The above-described monolith was dipped into an aqueous solution containing 10.2 mg of chloroplatinic acid (29.5 weight % Pt) per gram of solution and 5.1 mg of rhodium chloride (9.8 weight percent rhodium) per gram of solution. After dipping the excess solution was blown out with an air gun and calcined for about one hour at 540°. This catalytic composite was designated Catalyst C. The calculated composition of catalyst C in units of g/liter was: Pt=1.56; Rh=0.11; Ce=26.8; Co=3.53

EXAMPLE V

A third experimental catalytic composite was prepared by the following method. In a beaker, 5,000 grams of pseudo-boehmite alumina and 13,562 grams of a solution of cerium acetate were mixed, which solution contained 7 weight percent cerium. The resultant mixture was stirred for 30 minutes, transferred to a shallow tray, dried for 4 hours at 150° C. and finally calcined at 600° C. for 1 hour. The calcined alumina/cerium oxide powder was next stirred into a container which contained 5.33 liters of water and 48 mL of concentrated nitric acid ($HNO_3$).

In a beaker, 188.4 g of cerium oxide were added to 1,250 g of a solution of nickel acetate (11.6 weight percent nickel). The resultant mixture was stirred for 30 minutes, dried at 200° C. and then calcined at 540° C. for one hour. The calcined powder was added to the alumina/cerium oxide slurry and the mixture ball milled for 4 hours.

An oval shaped cordierite monolith with a minor axis of 3.2 inches (8.1 cm), a major axis of 5.7 inches (14.5 cm), a length of 6.0 inches (15.2 cm) and having 400 square channels per square inch of facial area was dipped into the above-described slurry. After dipping, the excess slurry was blown out with an air gun. The slurry coated monolith was calcined for about 2 hours at 540° C. The above-described dipping, blow-out and calcining steps were repeated until the monolith contained 128 g of coating per liter of monolith volume.

Next the platinum and rhodium metals were impregnated onto the above-described washcoated monolith. The above-described monolith was dipped into an aqueous solution containing 10.2 mg of chloroplatinic acid (29.5 weight % Pt per gram of solution) and 5.1 mg of rhodium chloride (9.8 weight percent rhodium per gram of solution). After dipping, the excess solution was blown out with an air gun and calcined for about one hour at 540° C. This catalytic composite was designated Catalyst D. The calculated composition of catalyst D in units of g/liter was: Pt=1.56; Rh=0.11; Ce=26.8; Ni=3.53

EXAMPLE VI

Catalysts A through D were evaluated using the test described in Example I. The results of this evaluation are presented in Table 2.

TABLE 2

| Sample I.D. | H$_2$S Concentration During Release Intervals (mins.) (mg H$_2$S/m$^3$ of gas scrubbed) | | | | | |
|---|---|---|---|---|---|---|
| | 0-1 | 1-2 | 2-3 | 3-4 | 9-10 | 14-15 |
| Catalyst A (conventional) | 74 | 34 | 22 | 38 | 7 | 7 |
| Catalyst B | 5 | 0 | 0 | 0 | 0 | 0 |
| Catalyst C | 30 | 7 | 3 | 0 | 6 | 2 |
| Catalyst D | 0 | 13 | 5 | 9 | 15 | 37 |

The results presented in Table 2 clearly indicate that the presence of metals such as cobalt and nickel greatly reduce the amount of hydrogen sulfide released from an automotive exhaust versus a conventional catalytic composite, especially in the first two minutes of fuel rich operation. Controlling the release of H$_2$S during the first two minutes of fuel rich operation is most important because fuel rich modes of operation typically do not last substantially longer than two minutes. Additionally, the H$_2$S emissions are most objectionable when released as large spikes such as exhibited by the conventional catalyst (catalyst A), but not exhibited by the catalysts of the instant invention. The data show that all three catalytic composites prepared according to the instant invention minimize the H$_2$S formation versus the conventional catalyst.

EXAMPLE VII

A fresh sample of catalyst A and catalyst B were prepared as stated in Examples II and III respectively. These catalysts were mounted in a converter and placed in the exhaust stream of a gasoline fueled engine. The engine was operated according to the following cycles:

(a) This durability cycle involved a 60 second cruise mode and a five second fuel cut mode. During the cruise mode, the engine operated at stoichiometry while during the fuel cut mode, the engine operated at a fuel lean condition that includes a temperature and an oxygen spike. Typically the exhaust temperature for the cruise mode was 760° C. while for the fuel cut mode the exhaust temperature was 704° C. This cycle was repeated for 100 hours.

(b) At the end of 100 hours of operation on the durability cycle of part A, the engine speed (revolutions per minute) and engine load were increased so that the catalyst bed temperature for the cruise mode was 850° C. while the catalyst bed temperature for the fuel cut mode was 800° C. This cycle was repeated for 40 hours.

After catalysts A and B were exposed to the durability cycle as described above, they were evaluated using an engine dynamometer performance test. The test involves evaluating the catalyst at seven different air/fuel (A/F) ratio points (14.71, 14.66, 14.61, 14.56, 14.51, 14.46 and 14.41) at an inlet temperature of 450° C. At each A/F point, the air/fuel is oscillated plus or minus 0.1 A/F at one Hertz frequency. Conversions of hydrocarbon, carbon monoxide and nitric oxides were calculated at each A/F and then an integral performance conversion was obtained by averaging all the conversions.

The results of these evaluations are presented in Table 3.

TABLE 3

| Catalyst I.D. | Integral Percent Conversion | | |
|---|---|---|---|
| | HC | CO | NO$_x$ |
| Catalyst A (Conventional) | 63 | 47 | 47 |
| Catalyst B | 70 | 48 | 49 |

The data presented in Table 3 show that after a severe durability test, catalyst B, which contains cobalt supported on zirconia, is more effective at treating an exhaust gas from an internal combustion engine than the conventional catalyst A.

What is claimed is:

1. A method of minimizing the formation of hydrogen sulfide when automotive exhaust is contacted with a catalytic composite comprising contacting said exhaust with a catalytic composite comprising a mixture of (1) a primary refractory inorganic oxide support having dispersed thereon at least one of a first active component selected from the group consisting of rare-earth oxides and (2) a secondary refractory inorganic oxide support selected from the group consisting of zirconia, titania, ceria, silica, magnesia, natural and synthetic zeolites having dispersed thereon at least one of a second active component which is an oxide of a metal, the metal selected from the group of metals which form a stable sulfide under fuel rich conditions, said second active component which is dispersed on the secondary support before formation of the mixture to effect a separation between the second active component and the primary support, and said mixture having at least one main catalytic metal selected from the group consisting of platinum, palladium, rhodium, ruthenium and iridium deposited thereon.

2. The method of claim 1 where the catalytic composite is formed in the shape of spheres of pellets.

3. The method of claim 1 where said catalytic composite is deposited on a solid ceramic or metallic carrier.

4. The method of claim 1 where said primary refractory inorganic oxide support is an alumina having a surface area of 25 to 300 m$^2$/g.

5. The method of claim 3 where said main catalytic metal is platinum which is present in a concentration in the range of about 0.15 to about 8.8 g per liter of carrier volume.

6. The method of claim 3 where said main catalytic metal is a mixture of platinum and rhodium, said platinum is present in a range of about 0.15 to about 8.8 g per liter of monolith carrier volume and said rhodium is present in a range of about 0.03 to 2.5 g per liter of carrier volume.

7. The method of claim 3 where said main catalytic metal is a mixture of palladium and rhodium, said palladium is present in a range of about 0.15 to 8.8 g per liter of carrier volume and said rhodium is present in a range of about 0.03 to about 2.5 g per liter of carrier volume.

8. The method of claim 1 where said rare earth oxide is cerium oxide and is present in a range of about 3.5 to about 55 g per liter of carrier volume.

9. The method of claim 1 where said catalytic composite remains effective after exposure to a temperature of at least 850° C.

10. The method of claim 3 where said rare earth oxide is lanthanum oxide and is present in a range of about 3.5 to about 55 g per liter of carrier volume.

11. The method of claim 3 where the second active component is an oxide of a metal, the metal selected from the group consisting of metals which form a stable sulfide such that the equilibrium constant, Kp, is less than $2 \times 10^{-3}$ at temperatures as high as 700° C.

12. The method of claim 11 where the metal is cobalt present in a concentration of about 0.7 to about 15 g per liter of carrier volume.

13. The method of claim 11 where the metal is nickel present in a range of from 0.7 to about 15 g per liter of carrier volume.

14. The method of claim 11 where the metal is zinc present in a range of from 0.7 to about 15 g per liter of carrier volume.

15. The method of claim 11 where the metal is copper present in a range of from 0.7 to about 15 g per liter of carrier volume.

16. The method of claim 1 where said secondary support is zirconia which is present in a range of from 0.7 to about 35 g per liter of carrier volume.

17. The method of claim 1 where said secondary support is ceria which is present in a range of from 0.7 to about 35 g per liter of carrier volume.

18. The method of claim 1 where said secondary support is titania which is present in a range of from 0.7 to about 35 g per liter of carrier volume.

* * * * *